United States Patent [19]
Sagi et al.

[11] 3,835,990
[45] Sept. 17, 1974

[54] THERMOMETER PACKAGING

[75] Inventors: Zsigmond L. Sagi, Parsippany; Robert C. Comer, Rockaway; Norman Andersen, Totowa; John R. Burtha, Essex Falls, all of N.J.; Samuel Pertchik, Long Beach, N.Y.

[73] Assignee: Bio-Medical Sciences Incorporated, Fairfield, N.J.

[22] Filed: Oct. 25, 1972

[21] Appl. No.: 300,495

[52] U.S. Cl. .................. 206/306, 73/356, 73/358
[51] Int. Cl. .......................................... G01k 11/08
[58] Field of Search ............ 73/358, 356; 206/16.5, 206/16.6; 116/114.5

[56] References Cited
UNITED STATES PATENTS

| | | | |
|---|---|---|---|
| 3,416,651 | 12/1968 | Jarund | 206/16.5 |
| 3,674,176 | 7/1972 | Sagi | 206/16.5 |
| 3,677,088 | 7/1972 | Lang | 73/358 |
| 3,677,866 | 7/1972 | Pickett | 206/16.5 |
| 3,712,141 | 1/1973 | Chadha | 73/356 |

*Primary Examiner*—Richard C. Queisser
*Assistant Examiner*—Denis E. Corr
*Attorney, Agent, or Firm*—Watson, Leavenworth, Kelton & Taggart

[57] ABSTRACT

A sterile thermometer package in which a generally flat disposable type thermometer is packaged is disclosed. The package comprises an envelope of first and second flat strips of material having vapor impervious and heat sealable character which are heat sealed together in a continuous heat seal course encircling the thermometer. A removable shield is disposed in the thermometer and is designed to maintain the thermometer operative indicating components separated until required for use, the shield having a pull tab thereon with which peeling removal of the same is initiated, the tab being anchored within and to the envelope on one end of the latter. To remove the thermometer from the package, the envelope is opened at the other end thereof to expose the thermometer handle and the thermometer then is removed from the envelope by pulling force applied to the thermometer such pulling action effecting removal of the shield within the package during course of the thermometer removal from the package. Further during removal of the thermometer from the package, a presser comb unit presses the operative elements in the indicating end of the thermometer into operative communication.

11 Claims, 12 Drawing Figures

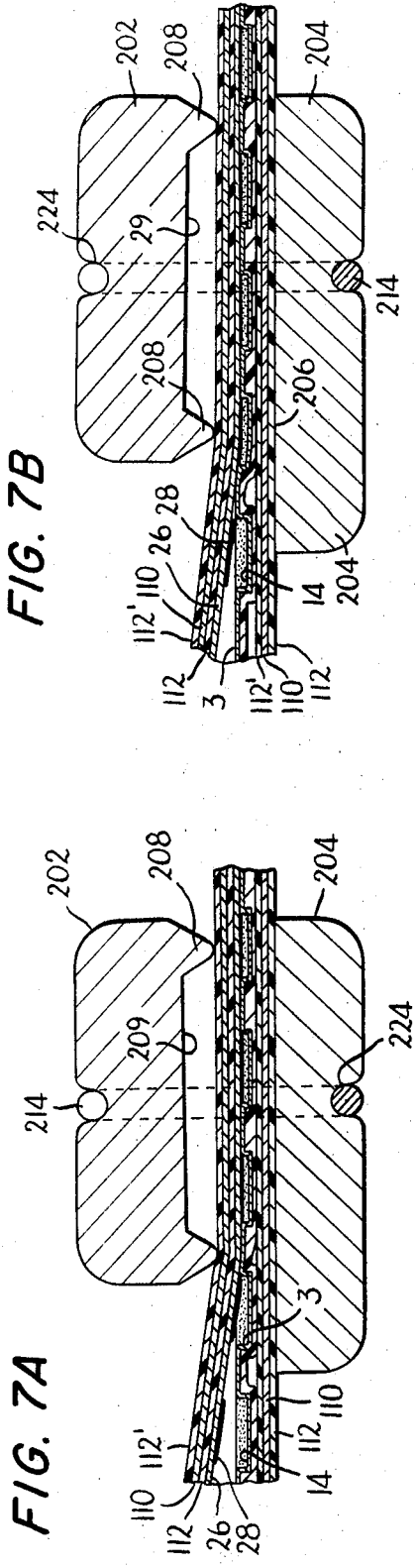
FIG. 7A
FIG. 7B
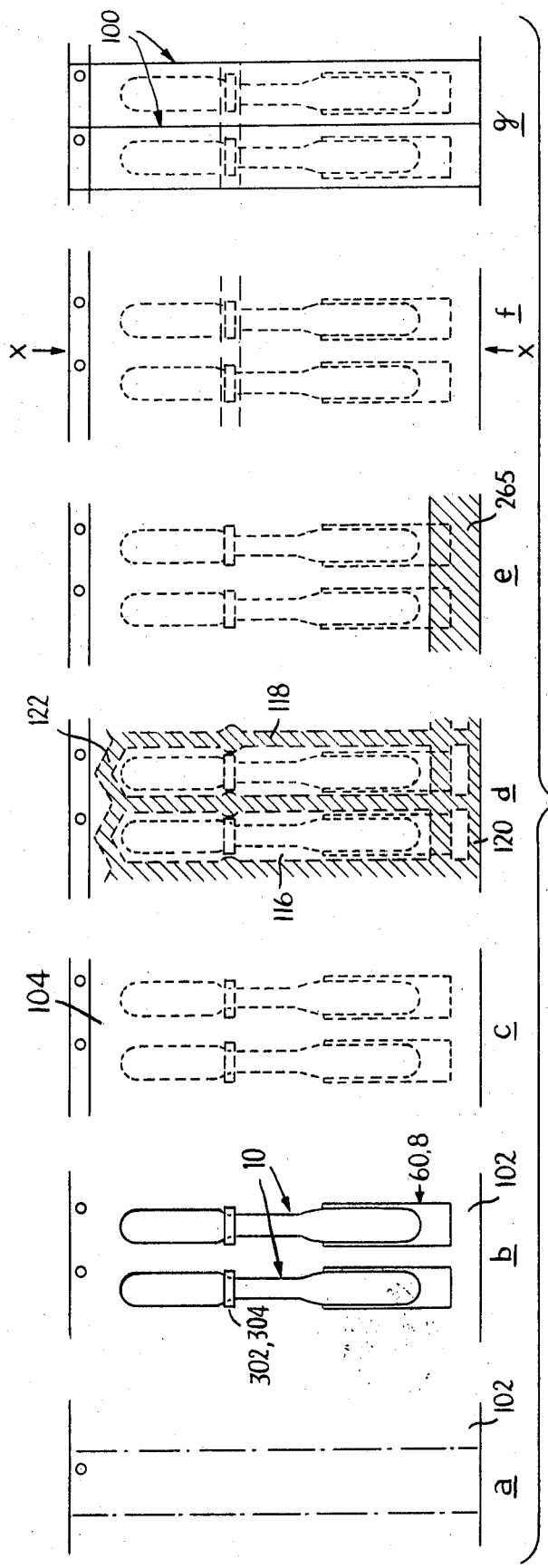
FIG. 8

THERMOMETER PACKAGING

BACKGROUND OF THE INVENTION

U.S. Pat. No. 3,665,770 describes a generally flat disposable type thermometer which is comprised of a thermally conductive sheet, e.g., a foil of aluminum in which is formed a number of cavities, each being filled with a thermally responsive substance provided in such quantity and/or composition as permits for change of the substance from solid to liquid state in graduated sequence responsive to the temperature of the subject being tested, one such substance being, e.g., a solid solution comprised of orthochloronitrobenzene and ortho-bromonitrobenzene. Also provided in that thermometer is an indicator means in suitable form, such as a dyestuff, which upon melting of the thermally responsive substance in the respective cavities cooperates with an acceptor as by migration thereto, to indicate visually by change of color of the acceptor a precise condition of temperature associated with each cavity. U.S. Pat. No. 3,677,088 and pending application Ser. No. 189,176 filed Oct. 14, 1971 now U.S. Pat. No. 3,712,141 each describe forms of a separator shield for embodiment in the thermometer which during the manufacture of the thermometer is removably inserted between the thermally responsive substance and the indicator means to bar communication therebetween until the thermometer actually is to be used, and further to enhance the storage or shelf life of the thermometer. Such shields as are described in said patent and application are made of materials compatible with the thermally responsive substance as well as the indicator means, i.e., they cause no adverse effect on the substance and indicator as would alter or prevent proper functioning of the same, the shields being provided with a pull tab to facilitate removal of the shield at the time the thermometer is to be used.

U.S. Pat. Nos. 3,677,866 and 3,674,176 describe devices for holding and dispensing plural quantities of such thermometers. It is also desirable however that there be provided a package in which a single thermometer can be packaged in sterile condition and be maintained in such condition until the thermometer is required for use. Such package should be easy and cheap to manufacture and should involve ready and simple dispensing of the thermometer therefrom at the time the thermometer is to be used with the package further embodying features which permit removal of the shield from the thermometer within the package and establishment of operative registering communication of the thermally responsive substance with the indicator means concurrent with the removal of the thermometer from the package.

SUMMARY OF THE INVENTION

The present invention is concerned with an improved package for storage and dispensing of a disposable chemical type thermometer. It is particularly concerned with providing a sterile package for use with a thermometer having a shield therein to protect the thermally responsive substance and maintain same separated from the indicator means until the thermometer is to be used. It is applicable to the thermometers and shields therefor described in U.S. Pat. No. 3,677,088 and pending application Ser. No. 189,176 and the description of said patent and application in respect of such thermometer and shield construction is incorporated by reference in this application.

The present invention provides a package in which thermometers having shields made in accordance with the aforementioned patent and application can be packaged in a single unit quantity to provide for protective sterile storage and handling of the thermometer prior to use but make it readily operatively available when needed, with removal of the thermometer from the package being achieved without need for the user to touch the thermometer indicating end to remove the shield therefrom.

In accordance with the present invention, a generally flat disposable type thermometer of the construction and having a shield as described in the aforementioned patent and application is packaged in an envelope of sufficient dimension to fully enclose the thermometer. The envelope preferably is comprised of first and second elongated substantially flat strips of a material having vapor impervious and heat sealable character, the strips being disposed in superposition with the thermometer sandwiched therebetween and extending longitudinally of the strips. The envelope strips desirably are provided as a plural ply laminate consisting of, for example, a first laminate ply of a foil of a metal such as aluminum, and a second ply provided as a film of a heat sealable material covering at least one face of said metal foil. When assembled to form the envelope structure, the envelope strips are arranged with the film coated faces thereof in juxtaposition with the strips being joined together in heat seal connection at marginal areal portions of each strip in a continuous heat seal course which encircles the thermometer with the strips in closely contoured contact with the thermometer. The heat seal course along with the vapor impervious and heat sealable character of the envelope strips thus provides a fully hermetically sealed enclosure in which the thermometer remains in sterile condition until required for use. Means are provided in the envelope for anchoring the pull tab means of the thermometer shield which extend longitudinally beyond an end of the thermometer, at one end of the envelope. Thus the pull tab of the shield whether it be a shield made according to the aforementioned patent or according to the aforementioned application Ser. No. 189,176 is anchored securely in one end of the envelope by means of a heat seal connection with the opposed inner film coated faces of the envelope strips. Accordingly and to facilitate anchoring of the pull tab means, the pull tab means is provided of a material which is amenable to heat sealing connection of same with the envelope strips. The other end of the envelope embodies means which permit for readily opening the same to expose an end portion of the thermometer, that is, the handle end of the thermometer, reference being made to U.S. Pat. No. 3,677,088 for description of the thermometer part constituting the handle. With the thermometer shield pull tab means securely anchored at one end of the envelope and with the envelope having been opened at the other end, the thermometer is exposed so that the same can be grasped in one hand of the user and while holding the other end of the thermometer package in the other hand, a pulling force can be applied to remove the thermometer from the envelope. Concurrent with removal of the thermometer from the envelope, the shield means will be removed from between the portions of the lengths of the strips of the thermometer which carry the components that have operative association for indicating temperature values. Such shield removal will be in accordance with the fuller description thereof as given in U.S. Pat. No. 3,677,088 or pending application Ser. No. 189,176.

In order to insure the proper alignment and registration of the indicator means and thermally responsive substance on the remaining length portions of the thermometer strips during the removal from the package, the envelope is provided with pressing means secured thereto and disposed interiorly or exteriorly thereon along the course of travel of the thermometer during removal for applying a pressing force against the thermometer at a location before it exits fully from the envelope through the open end thereof to therewith press the remaining portions of the thermometer strips into face-to-face communicative contact and assuring the proper alignment of the indicator means with the thermally responsive substance. Such pressing means conveniently is provided as a pair of comb elements extending transversely of the envelope with each comb element in contact with and associated with one of said envelope strips, the comb elements being connected to each other in a fixed relationship to define a pressing aperture of predetermined dimension through which the thermometer must pass during removal of the same from the envelope.

In one embodiment where the presser means are disposed exteriorly of the envelope, the comb elements include one having a broad substantially flat face in contact with its associated envelope strip outer surface, whereas, the other comb element has a face provided with a pair of protuberant parallel spaced apart ridges thereon and extending transversely of the envelope with the ridges in contact with the outer surface of the other face of the envelope. The ridges are spaced longitudinally of the envelope and such ridge carrying comb element is connected with the other comb element to have a certain freedom to pivot relative to said other comb element so it can move toward and away from the other element in conformance with the passage of any raised and depressed surfaces on the remaining length portions of the thermometer strip during passage of the latter through the pressing aperture and therewith provide uniform pressing force application to all face surface areas of the remaining length portions. In another embodiment, where the comb elements are disposed interiorly of the envelope, such elements are positioned at opposite sides of the thermometer strips inside the package and one of the comb elements includes a resilient component which is sufficiently flexible to contactingly conform with raised and depressed surfaces in the remaining length portions of thermometer strips during passage of the latter through the pressing aperture therewith to achieve uniform pressure application to said remaining length portions.

In accordance with the present invention, the heat seal course connection of the two envelope strips is provided in such manner as to include longitudinal portions extending along the transverse marginal areas of the envelope. In one embodiment, the heat seal course transverse portion at the end of the envelope which is to be opened is disposed in the shape of a chevron, the branches of which open longitudinally away from the adjacent transverse margin of the envelope and in the direction of the other end of the same so that certain areal portions of the envelope strips are unconnected and provide grasping surfaces for applying pulling force to break the chevron shaped heat seal and therewith open the envelope. In alternative form, the means for opening the envelope can be provided as a transversely weakened segment in the envelope spaced from the end which is to be opened and adapted to permit severance of common longitudinal portions of each of the envelope strips at the end to be opened from the remainder portion of the envelope by a tearing force applied to said envelope along the weakened segment.

The invention, accordingly, comprises the package possessing the features, properties and relation of elements will be exemplified in the device hereinafter described and the scope of the invention will be indicated in the claims.

BRIEF DESCRIPTION OF THE DRAWINGS

Other objects of the invention will be in part obvious and will in part appear from the following detailed description taken in conjunction with the accompanying drawings wherein like reference numerals indicate like parts throughout and in which:

FIGS. 7A and 7B are fragmentary vertical sectional views on enlarged scale depicting the manner in which the presser comb unit functions during the dispensing of the thermometer from the package and showing with clarity the rocking or pivoting movement of the ridge carrying comb elements.

FIGS. 8a—8g depict in plan view, the sequence of steps involved in packaging a thermometer in a package in accordance with the principles of the present invention.

DESCRIPTION OF THE PREFERRED EMBODIMENTS

Figure 1:
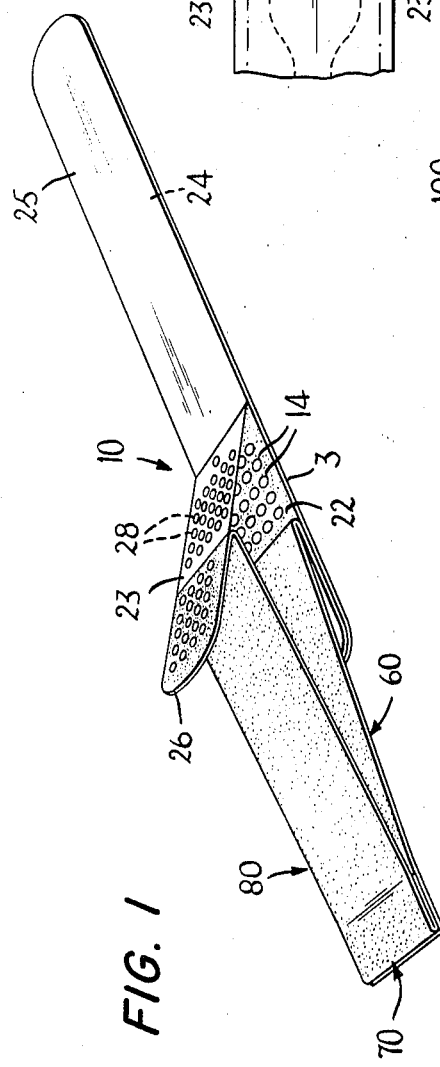
FIG. 1 is a perspective view of a disposable type thermometer having a removable shield therein made in accordance with the teaching of pending application Ser. No. 189,176, the shield which is a two component element associated with the thermometer thermally responsive substance and the indicator means, respectively, being shown in a position in which about one half of the shield has been removed from the thermometer indicating end.
Figure 2:
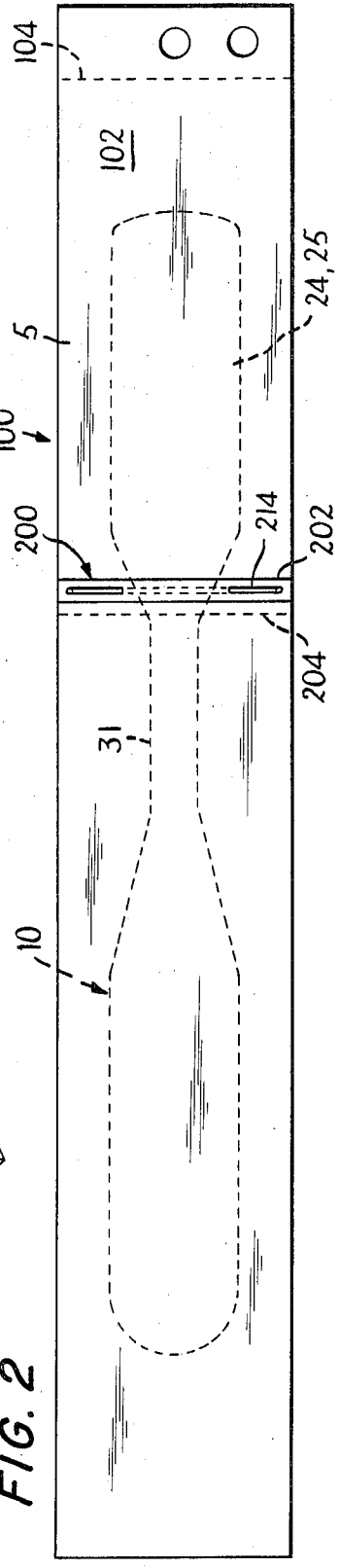
FIG. 2 is a top plan view of a thermometer package constructed in accordance with the principles of the present invention, the planar configuration or outline of the thermometer received in such package being somewhat modified with respect to that of the thermometer shown in FIG. 1, although the heat shield employed in the thermometer in the package of FIG. 2 is in all respects the same as that shown in the thermometer depicted in FIG. 1.

As a first consideration reference is made to FIG. 1 wherein there is depicted one form of thermometer 10 which can be packaged in accordance with the principles of the present invention, the construction of thermometer 10 being more fully described in pending application Ser. No. 189,176. Briefly the thermometer 10 is comprised of a pair of thermometer strips or elongated coextensive members. One strip 3 is made from a foil of metal and is provided with a plurality of cavities 14 in each of which is received thermally responsive substance, the metal strip foil having a section 22 comprising an indicator section thereof and a handle section 24. The second thermometer strip 26 is a transparent film which similarly is provided with a handle section 25 and an indicator section 23 in correspondence to the like sections of the metal foil strip. The indicator section 23 provides the mounting region for the indicator means 28 which are provided in corresponding plurality to the cavities 14 and which communicatively cooperate with the thermally responsive substance to indicate a precise temperature value when the thermometer is used. The thermometer further is provided with shield means 60 and 80, the shield component 60 being associated with the indicator section 22 of the metal foil sheet and connected thereto in heat sealed contact therewith to protect the thermally responsive substance, while on the other hand, the shield component 80 is associated with and adhesively secured to the transparent film indicator section 23 and is used to cover the indicator means 28. In FIG. 1 the shield components 60 and 80 are shown in a condition of being about half-way removed from the thermometer preliminary to use of the latter. While the thermometer 10 depicted in FIG. 1 will be referred to later herein in reference to packaging of the same, it will be understood that the present invention is equally applicable to the packaging of thermometers provided with a shield component made in accordance with the teaching of U.S. Pat. No. 3,677,088. Further the planar outline or overall configuration of the thermometer 10 shown in FIG. 1 is slightly different than that of the thermometer which will be described in reference to FIGS. 2–9. However, the difference in the thermometer shown in FIGS. 2–9 and that of FIG. 1 is only in relation to the necking in of the thermometer body as at 31 shown in FIGS. 2 and 3 since the indicator section and handle sections of the thermometer of FIGS. 2–9 otherwise are the same as the thermometer 10. Similarly, the shield components employed in the thermometer packaged in the package depicted in FIGS. 2–9 are in all respects the same as those depicted in FIG. 1.

Figure 3:
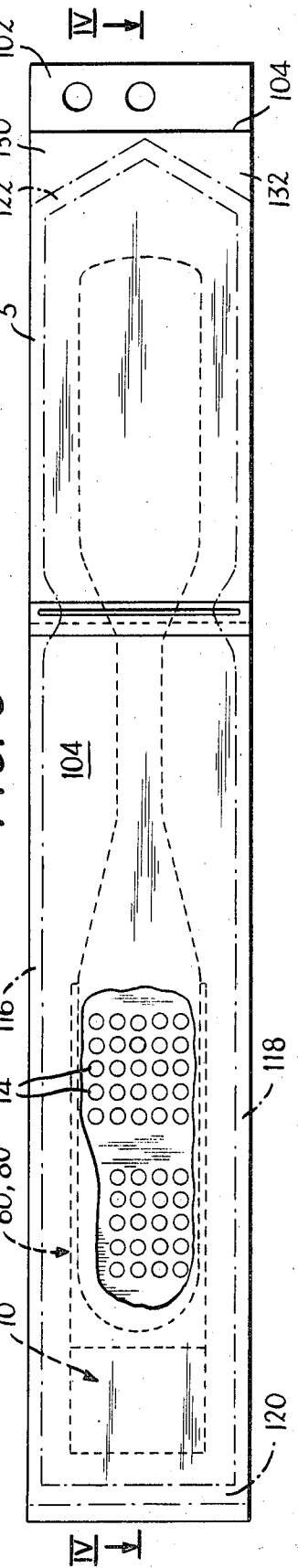
FIG. 3 is a bottom plan view of the thermometer package shown in the FIG. 2, a portion of the package at the indicating end of the thermometer being shown broken away and the heat seal connection course in which the envelope strips are joined together being depicted together in long and short dashed lines, with the pull tab means of the thermometer shield means being disposed in the envelope in the position in which it is joined in heat seal connection to the envelope to provide an anchorage used in conjunction with removal of the shield means at the time the thermometer is removed from the package.
Figure 4:
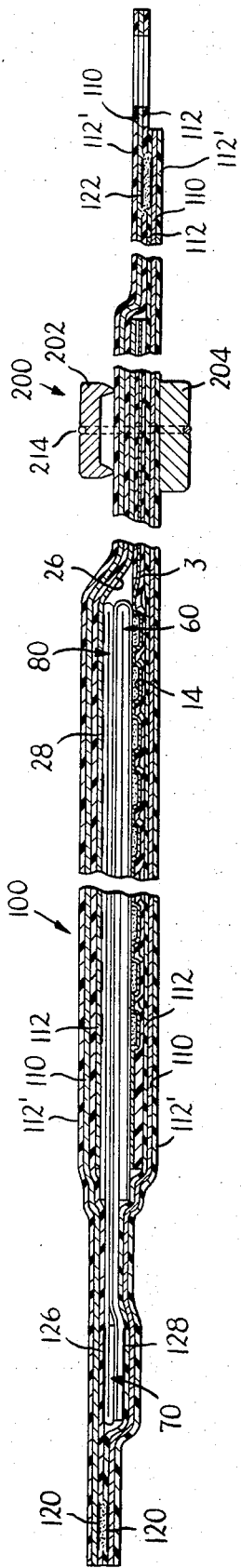
FIG. 4 is a longitudinal vertical sectional view on enlarged scale of the thermometer package shown in FIG. 2 as taken along the lines IV—IV in FIG. 3.
Figure 10:
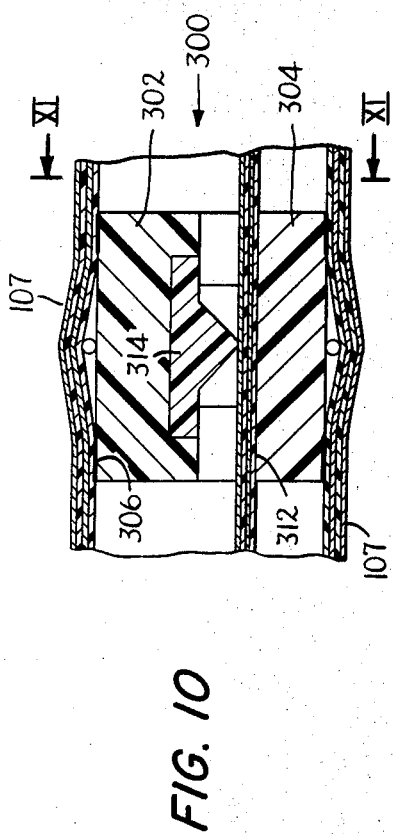
FIG. 10 is a fragmentary longitudinal vertical sectional view on enlarged scale of a further form of thermometer package in which the presser comb unit is disposed interiorly of the envelope and in which one of the comb elements includes a resilient component which is sufficiently flexible to contactingly conform with any raised and depressed surfaces on the thermometer to apply uniform pressure to the same.
Figure 11:
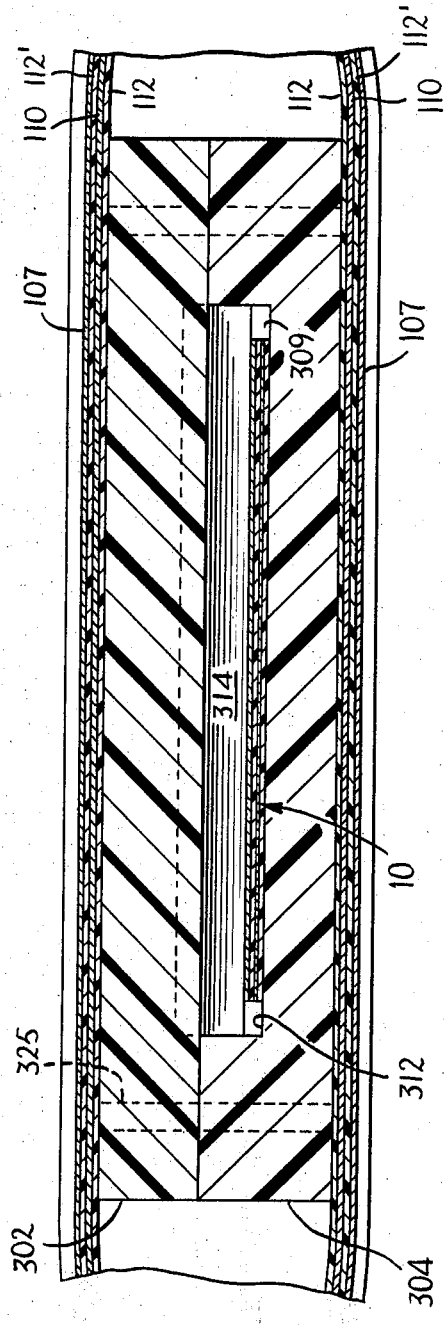
FIG. 11 is the transverse sectional view as viewed in the direction of the arrows XI—XI in FIG. 10.

The thermometer package 100 provided by the present invention will be now described with continuing reference to FIGS. 2–5. The package 100 is provided as an envelope 5 made from two generally coextensive superimposed strips of material 102, 104 each strip preferably being provided as a plural ply laminate. Thus, as can be seen in FIG. 4 each strip includes a metallic, e.g., aluminum foil ply 110, selected because of its vapor barrier properties, to at least one face of which is applied a coating or film 112 of a thermoplastic or heat sealable material. Materials particularly suited for the latter purpose include polymeric materials especially polyethylene. The other face of each strip 102, 104 also may be coated with a polymeric film 112' in the same manner provided a third laminate ply. Further and as shown in FIGS. 10 and 11, the plural ply laminate can include a fourth ply 107 covering the film 112', such fourth ply being provided with a material readily receptive to receiving printing indicia, e.g., cellophane or pouch paper. The envelope 5 is formed by heat sealing or joining together the two envelope strips 102 and 104 in a heat sealed contact at marginal areas of each in a continuous heat seal course encircling the thermometer 10 with the latter being sandwiched between the two envelope strips. Thus is shown in FIG. 3, the heat seal course has two portions 116, 118 thereof which extend at the marginal longitudinal extremities of the envelope 5, and a transverse course 120 at one end of the envelope with a second transverse course 122 being provided at the other end in the shape of a chevron, the branches of which open longitudinally away from the adjacent envelope transverse margin. The thermometer 10 is received in the envelope 5 in the manner shown in FIGS. 2–4 with the pull tab means 70 of the thermometer shield extending longitudinally beyond the indicator end of the thermometer so that the tab means can be received between the strips 102 and 104 and heat sealed thereto as at 126 and 128 to thus provide an anchoring means for the pull tab within the envelope. Other anchoring means also could be employed. For example, double face tape adhered to the pull tab means and to the envelope strip inner surfaces would serve the same purpose. The package 100 thus embodies the desirable qualities of providing a hermetically sealed enclosure for holding the thermometer 10 in a sterile environment until the thermometer is required for use. Further, the package is impervious to vapor penetration to additionally enhance the security with which the operative indicating components of the thermometer are maintained until the thermometer is used.

The envelope 5 also is provided with means by which the other end thereof, i.e., the end opposite the end at which the pull tab means is anchored, readily and easily can be opened at the time it is desired to use the thermometer. In the form of package 100 shown in FIGS. 2–6, the means for readily opening the envelope 5 is provided by the arrangement of the chevron shaped heat seal course branch 122 which in extending in that particular configuration results in certain areal portions of the envelope strips as at 130 and 132 remaining unconnected so that these areal portions of the respective strips can be separated by digital manipulation and a pulling force applied to the same to break the chevron heat seal, to open the envelope to the extent depicted in FIG. 5 thereby exposing one end of the thermometer for gripping the same. To further facilitate grasping the envelope strips 102, 104 as a preliminary to opening the end of the same, one of the strips 102 is made somewhat longer than the other and thus provides a flap for the purpose of effecting ready separation of the two strips at the opening end of the envelope.

The package 100 further embodies pressing means which is in one form thereof is shown generally at 200, such means conveniently being provided as a pair of opposed comb elements 202, 204 extending transversely and exteriorly of the envelope and fixedly disposed at a location thereon along the course of removal travel of the thermometer from the envelope for applying at said location a pressing force against the thermometer to press the remaining length portions of the thermometer strips into face-to-face contact following removal of the shield means and thus bring the indicating components into operative registered communication. Desirably, the positioning of the presser means 200 on the envelope 5 will be at a location removed from the end at which the pull tab is anchored which is at least beyond the distance to which the shield means will unfold or extend within the envelope when fully removed from the thermometer during dispensing.

Figure 5:
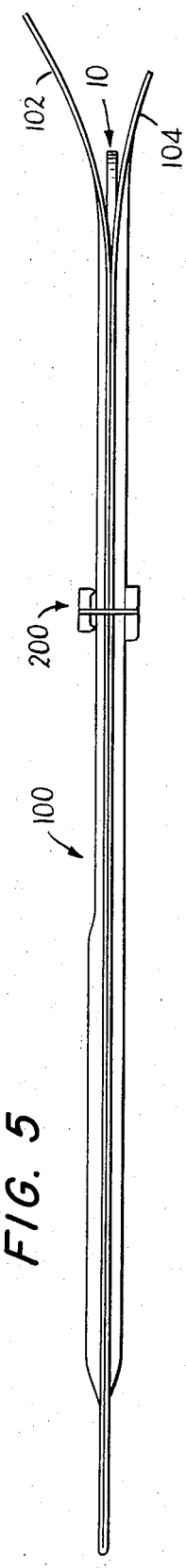
FIG. 5 is a side elevational view of the thermometer package shown in FIGS. 2 and 3 following the opening of one end of the package to expose an end portion of the thermometer preliminary to removal of the thermometer from the package.
Figure 6:
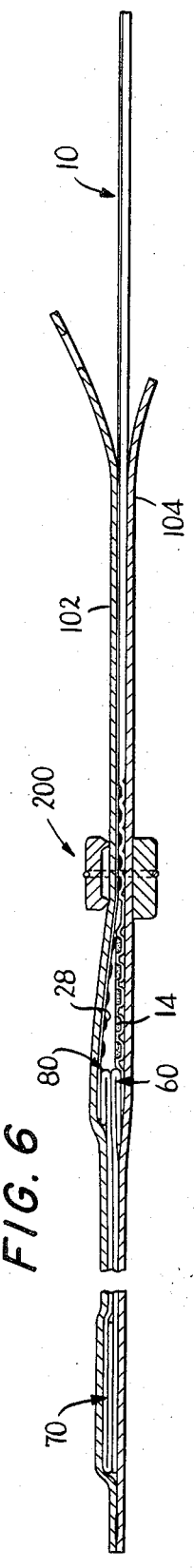
FIG. 6 is a longitudinal vertical sectional view of the thermometer shown in FIG. 5 at a point when the shield is substantially removed within the package from between the indicator means and thermally responsive substance in the thermometer with the thermometer being shown pulled through the aperture defined in the envelope by the comb presser unit which presses the indicator means and thermally responsive substance ends of the thermometer strips into face-to-face contact before the thermometer is fully removed from the envelope.

When the thermometer 10 has been packaged in the envelope 5, the sealed package presents the configuration shown in FIG. 4. Thus the shield components 60 and 80 lie sandwiched between the indicator sections of the two thermometer strips which make up the thermometer and maintain the indicator means 28 out of contact with the thermally responsive substance in the cavities 14, the shield component 60 further being adapted as described in application Ser. No. 189,176 to completely seal the thermally responsive substance from all adverse environmental conditions and thus enhance the shelf life of the thermometer. Further the pull tab means 70 at the end of the shield components is anchored, i.e., heat sealed to the envelope at the left hand end thereof as at 126, 128. When it is desired to open the package 100 to use the thermometer 10, the opening of the said opposite end is effected as described earlier to produce an opening defined by the separated two envelope strips 102 and 104 at the envelope right end as shown in FIG. 5. The user then holding the exposed end of the thermometer 10 in one hand and the other or anchorage end of the package in the other hand applies a pulling force to the thermometer. Such action concurrently initiates removal of the thermometer from the envelope and of the shield components 60 and 80 in the fashion depicted in FIG. 6 with the portions of the indicator sections, i.e., the remaining length portions of the thermometer strip elements being brought into register and securely pressed together by the pressing means 200 during thermometer travel out of the package.

Further understanding of the pressing means 200 will be had with reference to the pressing means 200 shown in FIGS. 7A and 7B. Such means are comprised of two transversely directed comb elements 202 and 204 in contact with and associated with one of said envelope strips and which are connected to each other in a predetermined relationship to define a pressing aperture of predetermined dimension within the envelope 5 through which the thermometer must pass during removal of the same from the envelope, such passage through the aperture effecting the necessary pressing force to the thermometer remaining length portions to insure that the indicator means is properly registerably and securely pressed into contact with the thermally responsive substance. One comb element 204 is provided with a broad substantially flat faced surface as at 206 which lays against the outer surface of one envelope strip 102 while on the other hand, the other comb element 202 is provided with a pair of protuberant parallel spaced apart (with a recess 209 therebetween) ridges 208 which extend fully transversely of the envelope in contact with the outer face of strip 104 and which ridges are longitudinally spaced in respect of the envelope in the manner shown in FIGS. 7A and 7B to insure that an equal pressing force is applied against the thermometer during removal of same from the envelope. As can be seen in FIGS. 7A and 7B which show moved position of comb element 202, comb element 202 is connected with element 204 such as to have a certain freedom to pivot relative to said comb element 204, thereby providing that the ridges 208 alternately can move toward and away from comb element 204 in conformance with the passage of any raised and depressed surfaces on the remaining length portions of the thermometer strips through the pressing aperture and therewith provide the necessary uniform application of pressing force to said remaining length portions of the thermometer strips to insure achievement of full three dimensional face-to-face engagement of indicator section 23 of strip 26 with indicator section 22 of strip 3.

As shown in FIGS. 2, 3, 7A and 7B, the comb elements 202 and 204 can be connected together and also to envelope 5 in various ways. For example, a fastener, e.g., staple 214 passing through both and through the envelope structure at the longitudinal marginal heat seal portions 116, 118 and clenched around the comb element 202 can be used. To facilitate recessed reception of the staple 214, the comb element external surfaces can be provided with grooves as at 224 to thus avoid the presence of sharp projections on the package exterior. Any other suitable manner of connecting the combs in rigid fixed relationship also can be employed.

FIGS. 7A and 7B show graphically on enlarged scale the manner in which the comb element 202 rocks or pivots in the direction of the comb element 204 to assure uniform pressing force application. Thus while one ridge 208 is in contact with the envelope 5 in a position overlying the high point in the package defined by the thermometer cavities 14 therein, e.g., the right ridge 208 has elevated to conform to the same, the left hand ridge 208 is shown in FIG. 7A as having rocked downwardly to conform to the lesser thickness encountered in the package at locations between adjacent cavities 14. FIG. 7B shows the opposite condition in which the right hand ridge 208 is conforming closely with the package in a position over a region intermediate two cavities 14, whereas the left hand ridge 208 is pivoted upwardly in conformance to the thicker package structure above a cavity 14.

While the pressing means can be provided exteriorly of the package 100 as already described, it is also possible to locate such pressing means interiorly of the package. FIGS. 10 and 11 depict such form of pressing means 300. Referring now to FIGS. 10 and 11, the pressing means 300 includes a pressing element 302 and a companion pressing element 304 each associated with and attached respectively to the package envelope strips 102, 104. The comb elements 302, 304 can be connected to the interior surfaces of the strips 102, 104 in any suitable manner to fix them securely as, for example, by heat sealing as at 306 or such other suitable method including ultrasonic sealing technique. The comb elements 302, 304 are disposed or positioned at opposite sides of the thermometer strips in the region of the handle sections of the latter. As can be seen in FIG. 10, the comb elements have juxtaposed surfaces which define the pressing aperture 309 through which the thermometer passes. Thus the element 304 has a broad substantially flat face portion 312 in contact with the thermometer strip structure 3, whereas the other comb element is in contact with the thermometer strip 26 and includes a resilient component 314 which is in direct contact with such thermometer strip 26. The resilient component 314 preferably is provided as a material having sufficient flexibility to contactingly conform with any raised and depressed surfaces (constituted by the indicator means 28 and cavities 14) in the remaining length portions of the thermometer strips during removal of the thermometer and passage of the same through the pressing aperture 309 so that the resilient component applies uniform pressing force in a three dimensional manner to bring the indicator means into registration with the thermally responsive substance in the same manner as described earlier herein. The resilient component 314 is an elongated element extending transversely of the envelope 5, and provided as an inverted triangle, the apex of which is in contact with the thermometer strip 26. Materials suitable for the resilient component preferably are those having memory properties. A particularly suitable material is polyurethane. The pressing means can employ for connection together of the comb elements a fastener 325 in the same manner as described in connection with the pressing means 200 with such fastener being disposed as shown in FIG. 10 or, alternatively, the comb elements 302, 304 can be provided with grooves for recessed reception of the fastener in which event the heat seal of the comb element as at 306 to the associated strips can be enlarged to include the inner surface of the strips shown in raised position outside the fastener in FIG. 10.

Figure 9:
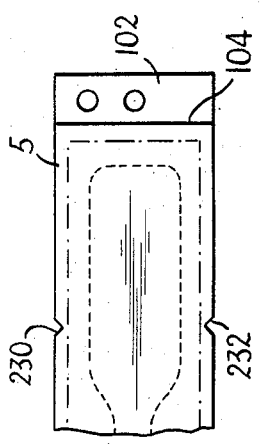
FIG. 9 shows an alternative form of package construction in which a weakened section is provided therein to permit opening of the package at the time it is required to use the thermometer.

FIG. 9 shows an alternative form of providing readily opening feature in the envelope 5 at the end thereof through which dispensing is effected. Thus a weakened readily tearable segment extending transversely of the envelope can be provided by a pair of notches 230, 232 which effectively reduce the heat sealed connection of the two envelope strips 102 and 104 at such locations thereby rendering the same susceptible to tearing and severance of common longitudinal portions of each of said strips from the remainder thereof upon applying appropriate tearing force to the envelope structure along said weakened segment.

FIGS. 8a–8g depict sequentially the steps involved in one manner of producing thermometer packages 100 in production quantities. Thus, a continuous strip of envelope material 102 is advanced along the production line and as shown in step b thermometers 10 to which pressing comb elements 302, 304 have been affixed by means of a staple, are laid on the strip 102. A second strip 104 of envelope material is then disposed on top of the thermometers 10 (step c) and as shown in step d heat sealing is effected in a fully encircling course around each thermometer to join the two strips 102, 104 forming associated envelopes 5 together and also to effect a heat sealing of the pull tab means 70 of the shields within each envelope and of the comb elements 302, 304 to the envelope inner surfaces. As shown in step e, the ends of the respective packages then can be provided with a knurled surface 265 to facilitate holding of the same during dispensing. In step f, severance of the finished packages 100 from the continuous stock is performed along line X—X to produce individual packages as shown in step g.

Thus it will be noted from the foregoing that the present invention provides a novel disposable thermometer package which can be used easily, conveniently and without subjecting the thermometers to contamination by unnecessary contact with the hands of the user during the opening of the package and removal of the thermometer from the same.

What is claimed is:

1. A sterile thermometer package comprising in combination with a disposable thermometer of the type which includes at least two elongated superimposed, co-extensive strips joined in adhesive face-to-face contact along corresponding first portions of the length of each strip, the remaining length portions of each of said strips carrying components for detecting and indicating temperature values and which have operative association when said remaining length portions are pressed into face-to-face contact, said remaining length portions normally being intervened by shield means peelably removably secured to the remaining length portion of at least one of said strips for preventing face-to-face contact of said remaining length portions, said shield means embodying pull tab means extending longitudinally beyond said superimposed strips for initiating peeling removal of said shield means, an envelope comprising superimposed first and second elongated substantially flat strips of flexible material which is vapor impervious and heat sealable, said thermometer extending longitudinally of and being sandwiched between said strips, said strips being joined together at marginal area portions of each in a continuous heat sealed connection encircling said thermometer with said in closely inclosely contoured contact with said thermometer, means for anchoring the pull tab means of said thermometer shield means to one end of said envelope, means embodied in said envelope for readily opening the same at the other end thereof to expose an end portion of said thermometer, said thermometer being removable from said envelope through the opening at said other end thereof by means of pulling force applied to said end portion of said thermometer, said shield means peeling from the remaining length portion of the strip to which it is attached upon application of said pulling force, and pressing means embodied with said envelope and fixedly disposed at a location thereon along the course of removal travel of said thermometer from said envelope for applying at said location, a pressing force against said thermometer before it exits fully from said envelope sufficient to press said remaining length portion of the strips thereof into face-to-face contact following removal of the shield means from the thermometer, said pressing means comprising a pair of comb elements extending transversely of said envelope with each comb element in contact with and associated with one of said envelope strips, said comb elements being connected to said associated envelope strips and to each other in a fixed relationship to define a pressing aperture of fixed dimension within said envelope through which said thermometer must pass during removal of same from said envelope thereby to press said remaining length portions of the thermometer strips into face-to-face contact following removal of the shield means.

2. The thermometer package of claim 1 in which said pair of comb elements are disposed exteriorly of said envelope one each at the opposite outer surfaces of said envelope; said comb elements being connected to each other by a fastener extending through each and through the longitudinal marginal heat seal portions joining together said envelope strips.

3. The thermometer package of claim 2 in which said fastener is a staple.

4. The thermometer package of claim 3 in which grooves are provided in the external surfaces of said comb elements for recessed reception of said staple in said comb elements.

5. The thermometer package of claim 2 in which one of said comb elements has a broad substantially flat face lying in contact with its associated envelope strip outer surface, the other of said comb elements having a face provided with a pair of protuberant parallel spaced apart ridges thereon disposed and extending transversely of the envelope in contact with the other face of said envelope, there being a recess in said other comb element face intermediate said pair of ridges, the latter being spaced longitudinally of said envelope with said other comb element being connected with said one comb element such as to have a certain freedom to pivot relative to said one comb element providing that said ridges alternatly can move toward and away from from said one comb element in conformance with the remaining length portions of the thermometer strips through said pressing aperture and therewith provide uniform application of pressing force to said remaining length portions of the thermometer strips during exit of the thermometer from the envelope.

6. The thermometer package of claim 1 in which said pair of comb elements are disposed interiorly of said envelope, each comb element being connected to the inner surfaces of its associated envelope strip, said comb elements being positioned at opposite sides of said thermometer strips and having juxtaposed surfaces defining said pressing aperture.

7. The thermometer package of claim 6 in which one of said comb elements has a broad substantially flat face portion in contact with one of said thermometer strips, the other of said comb elements including a resilient component in contact with the other of said thermometer strips, said resilient component and said flat face portion defining said pressing aperture, said resilient component being sufficiently flexible to contactingly conform with raised and depressed surfaces in the remaining length portions of said thermometer strips during the passage of the latter through said pressing aperture and therewith provide uniform application of pressing force to said remaining length portions of the thermometer strips during exit of the thermometer from the envelope.

8. The thermometer package of claim 7 in which said resilient component is an elongated element extending transversely of said envelope in the form of an inverted triangle, the apex of which contacts said other thermometer strip.

9. The thermometer package of claim 7 in which said resilient component is made of a material having memory properties.

10. The thermometer package of claim 8 in which said material is a polyurethane.

11. The thermometer package of claim 1 in which said comb elements are disposed in fixed relationship to each other and are comprised of material so as to effect a three-dimensional comb pressure on said remaining length portions of the thermometer strips during removal of the thermometer from the envelope.

* * * * *